United States Patent
Peng

(10) Patent No.: US 6,553,110 B1
(45) Date of Patent: Apr. 22, 2003

(54) SELECTIVE TELEPHONE CALLER IDENTIFICATION SERVICE

(75) Inventor: Sharon Peng, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/411,460

(22) Filed: Oct. 1, 1999

(51) Int. Cl.7 .............................. H04M 1/56; H04M 3/42
(52) U.S. Cl. ............................... 379/210.03; 379/142.02
(58) Field of Search ..................... 379/210.02, 211.01, 379/211.02, 142.05, 142.02, 196–198, 207.15, 210.03; 713/160, 161, 200–202

(56) References Cited

U.S. PATENT DOCUMENTS 5,289,542 A    2/1994  Kessler ...................... 380/257
5,467,388 A  * 11/1995  Redd et al. ............. 379/210.02

FOREIGN PATENT DOCUMENTS

| EP | 0768785 A2 | 4/1997 |
| EP | 0843489 A1 | 5/1998 |
| JP | 09036952 A | 2/1997 |
| WO | 9842115 A1 | 9/1998 |

* cited by examiner

Primary Examiner—Benny Q. Tieu
(74) Attorney, Agent, or Firm—Russell Gross

(57) ABSTRACT

A method of selective telephone caller identification includes the steps of providing a list of telephone numbers of second parties to which a first party is willing to release identification information regarding the first party (101). This list is supplied to, and stored in a database of, a telephone company by the request of the first party if the first party subscribes to a call blocking service with the telephone company (102). When the first party dials a telephone number (104), the telephone company determines whether the first party subscribes to the call blocking service (105). If yes, the telephone company searches the list in the database to determine if the dialed telephone number is on the list (106). When it is determined that the first party subscribes to the call blocking service and the dialed telephone number is not on the list, the telephone ID information is blocked by the telephone company (111). When it is determined that the first party subscribes to the call blocking service and that the dialed telephone number is on the list, the ID information is encrypted, a header is added (107), and a connection is provided between the first party and the second party by the telephone company (108). At such time, the identification information regarding the first party is encrypted and sent to the second party (109).

12 Claims, 2 Drawing Sheets

SELECTIVE TELEPHONE CALLER IDENTIFICATION SERVICE

BACKGROUND OF THE INVENTION

1. Field of the Invention

The present invention relates generally to caller identification services in a telephone system, and more particularly, is directed to a selective telephone caller identification service.

2. Background Information

With the advancement of digital telecommunication technology, more and more features and services are being offered by telephone service providers (i.e., a telephone company). For example, one such feature is caller identification (ID) wherein the called party (i.e., recipient or receiver) is able to identify and display the calling party's (i.e., caller's) telephone number before the called party answers the call. This function is currently implemented with an agreement among three parties, namely, 1) the called party, 2) the calling party and 3) the telephone service provider. First, the telephone service provider needs to provide the caller ID service and send out the caller ID information with the telephone ringing signal. Second, the called party must subscribe to the caller ID service and have a caller ID box coupled to the telephone line. Third, the calling party must agree to release his caller ID to the public. The first two parts are controlled by the telephone service provider and the called party. If the called party subscribes to the caller ID service through the telephone service provider and has a caller ID box available, then he will receive the caller ID information when his telephone rings. The third part is controlled by the calling party. If the calling party does not want to release his private telephone number to public, that is, to any caller ID service, he can ask the telephone service provider to completely block the calling party's telephone number to any caller ID subscriber.

The consequence of this action by the calling party is that if the called party recipient subscribes to the caller ID service, the called party's telephone would not ring when a call is placed from the private telephone of the calling party. This is referred herein as a double side security crash, that is, where the calling party blocks the caller ID when the called party uses a caller ID service. The only time that the telephone rings for a called party with a caller ID service is when his caller ID service has clearly identified the calling party's ID. There is no classification of the telephone blockage. In other words, the blockage will block the calling party's ID to any party's caller ID service which receives the calling party's telephone calls, regardless of whether the calling party is the called party's family member, or if the calling party is making an emergency call. This black and white blockage may cause some problems in certain situations.

For example, some people do not want to receive unidentified telephone calls or commercial calls. This might be the reason that a person subscribes to the caller ID services. If the calling party blocks his or her ID completely, the telephone number he dials will not ring the called party's telephone, which includes a caller ID box, because the caller ID service classifies this incoming call as an anonymous call. The result is that the called party may miss some very important calls that he may not want to miss. This is currently a burden for some people who own a caller ID box and subscribe to the caller ID service, or for somebody who chooses to block their private telephone numbers from the public.

Another situation where this double side security crash could cause a problem is with a security computer call back service. For example, some companies provide a defensive call back service for employees who want to remotely log on to a company computer (for example, from their home). In most cases, the employees provide their telephone number to the computer service so that their numbers are saved in the computer database. If a dial-in ring is received by the company computer service, the security calling number identification service first finds out if the calling party's number matches any of the telephone numbers in the database. If there is a match, further security checks proceed. If the calling party's telephone number is not within the database, the telephone call is rejected. In this situation, if the calling party has blocked his or her number from the public, the company's computer security service will not be able to determine the incoming telephone number, and the call will be rejected.

According to Bell Atlantic, the current solution for this complete blockage problem is as follows. If the calling party has chosen to completely block his telephone number, he can perform an online unblock to a specific telephone number. For example, if the calling party is calling a party who subscribes to the caller ID service, his telephone call will not ring the called party because the called party's caller ID classifies the telephone call as an unknown caller and will not activate the ringer. At the same time, the calling party will hear a message from the telephone company service recording center informing the calling party that if he wants the telephone call to go through, the calling party can temporarily suspend the caller ID block by pushing *82. After pushing *82, the called party's caller ID box will display the calling party's telephone number and name, and the telephone will ring.

Although Bell Atlantic's current approach has solved part of the problem, it is not a handy solution for customers. If the calling party is dialing in an urgent situation (e.g., calling a doctor's office), he may have difficulty determining how to enable the telephone call to proceed. This is especially true for children or people with language understanding problems. For the computer security defensive dial-in service, it could also be a burden, because the company's computer may not wait for the telephone number to be unblocked before it rejects the dial-in request.

Once a calling party has decided to release his caller ID to the called party, it is possible that someone who is monitoring either the calling party's or called party's telephone line will be able to identify both the calling party's caller ID information and the communication content. This could likely occur if either the caller or receiving party's phone is of a cellular type.

OBJECTS AND SUMMARY OF THE INVENTION

Accordingly, it is an object of the present invention to provide a selective telephone caller identification service that overcomes the aforementioned problems with the prior art.

It is another object of the present invention to provide a selective telephone caller identification service that provides a way for a caller who subscribes to a telephone caller ID or blocking service to control the way in which his telephone number is released to and withheld from called parties.

It is a further object of the present invention to provide a selective telephone caller identification service that provides a further security operation by encrypting/decrypting the caller ID.

It is a still further object of the present invention to provide a selective telephone caller identification service that enables use of detailed schemes on the receiver side as to how to handle the blocked caller ID by using a header of one or two bits.

In accordance with an aspect of the present invention, a method of selective telephone caller identification includes the steps of providing a list of telephone numbers of second parties to which a first party is willing to release identification information regarding the first party. This list is supplied to a telephone company by the first party if the first party subscribes to a call blocking service with the telephone company. Then, the list of telephone numbers is stored by the telephone company in a database. When the first party dials a telephone number to make a telephone call, the telephone company determines whether the first party subscribes to the call blocking service with the telephone company. If the first party does subscribe to the call blocking service, the telephone company searches the list of stored telephone numbers when the first party dials a telephone number to make a telephone call to determine if the dialed telephone number is on the list of stored telephone numbers. When it is determined that the dialed telephone number is not on the list of telephone numbers, the telephone ID information of the first party is blocked by the telephone company. When it is determined that the first party subscribes to the call blocking service and that the dialed telephone number is on the list of telephone numbers, caller ID information is provided when connected between the first party and the second party by the telephone company. At such time, the identification information regarding the first party is encrypted and sent to the second party.

In accordance with another aspect of the present invention, a method of selective telephone caller identification includes the steps of providing a list of telephone numbers of second parties to which a first party is willing to release identification information regarding the first party. Then, the list of telephone numbers is stored in a database. When the first party dials a telephone number to make a telephone call, a determination is made whether the first party subscribes to the call blocking service. If the first party does subscribe to the call blocking service when the first party dials a telephone number to make a telephone call, a search of the list of stored telephone numbers is conducted to determine if the dialed telephone number is on the list of stored telephone numbers. When it is determined that the first party subscribes to the call blocking service and that the dialed telephone number is on the list of telephone numbers, a connection is provided between the first party and the second party. At such time, the identification information regarding the first party is encrypted. Then the encrypted identification information of the first party is sent to the second party.

The above and other objects, features and advantages of the invention will become readily apparent from the following detailed description thereof which is to be read in connection with the accompanying drawings.

DETAILED DESCRIPTION OF THE PREFERRED EMBODIMENT

Figure 1:
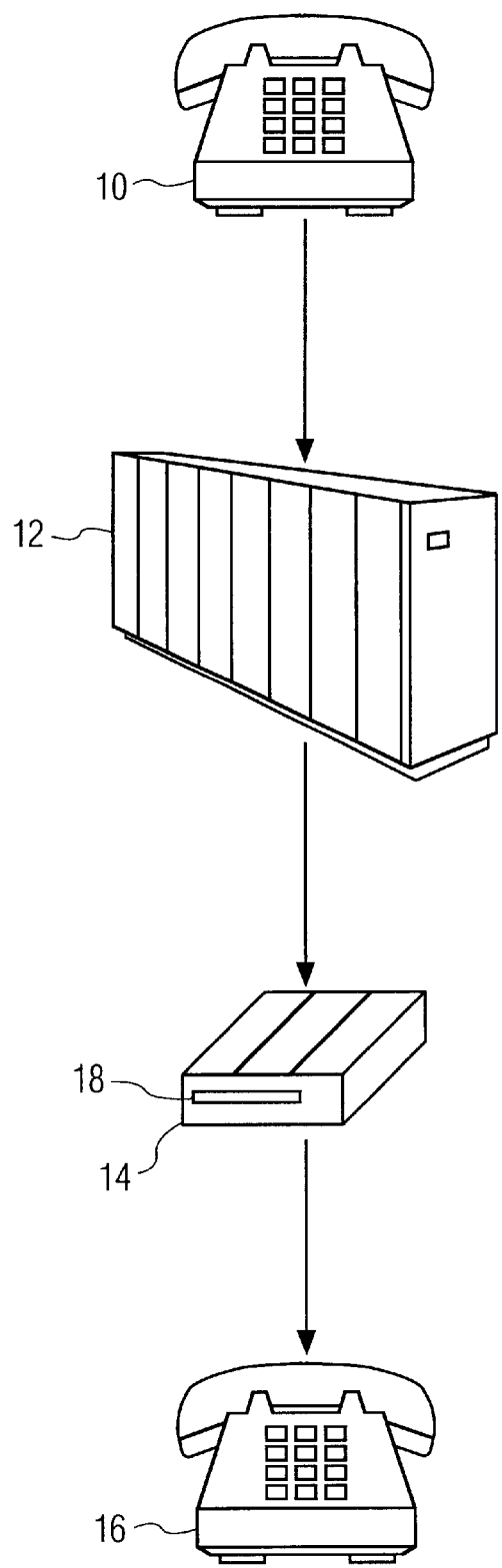
FIG. 1 is a schematic view of a telephone system with which the selective telephone caller identification service according to the present invention can be used.

Referring now to the drawings, the present invention provides a solution to the aforementioned problems. According to the present invention, a caller can select one of the following three choices from his/her telephone service:

1) Release his caller ID to the public;
2) Completely block his caller ID to the public; or
3) Block his caller ID in general, except as to certain selected numbers.

The first and second choices are currently implemented and in use by telephone service providers. As for the third choice, the telephone calls would be automatically classified to different receivers. In this regard, it is first assumed that the caller chooses to block his caller ID, except to certain chosen recipients. Therefore, the caller must first provide the telephone company with a list of recipients' numbers for whom the caller ID information will be released. The telephone company then determines if the party that the caller is attempting to reach is listed on the caller's selected release list. If the called party is not contained on the caller's list of telephone numbers, the caller ID is blocked. If the called party's telephone number is on the caller's list of telephone numbers, then the caller ID information is encrypted, for example, at the telephone company's signal generating end, with the calling number (destination number). On top of the encrypted message, a header is added to indicate that this is an encrypted message. For cases 1 and 2 discussed above, headers are also used, as will be described hereinafter.

When the called party receives the telephone call, and if the called party subscribes to the caller ID service, the called party's caller ID box first checks the message header to see what type of message is being received. If it is a publicly available caller ID, the telephone number is merely displayed on the screen. If it is a completely blocked message, the caller ID box will display a message "UNKNOWN", and block the telephone ring.

If it is an encrypted message, the caller ID box will decrypt the message with its own number as a key, assuming that the subscriber's machine uses the same but reverse scheme for decryption as the encryption. If the decrypted message is a valid message, that is, a message including information as to the caller's ID, it will be displayed. Otherwise, it will display a message "UNKNOWN".

It should be mentioned that the calling number used for encryption is a random number to the public, but it is specific to the targeted receiver. The encryption algorithm need not be complicated to achieve the goal. The process of encrypting/decrypting the caller ID is particularly useful for wireless or some security required services. In this case, even is if the telephone line is monitored by a third party, the third party can not identify who is making a call.

It is envisioned that if security over both wired and wireless channels is not considered, encryption could be eliminated. This means that if the system at the telephone company side determines that the destination of the call is listed on the caller's release list, the system sends the caller ID information, without encryption. Otherwise, it blocks the information.

The details of the caller ID and encryption/decryption scheme will now be described in further detail.

Figure 2:
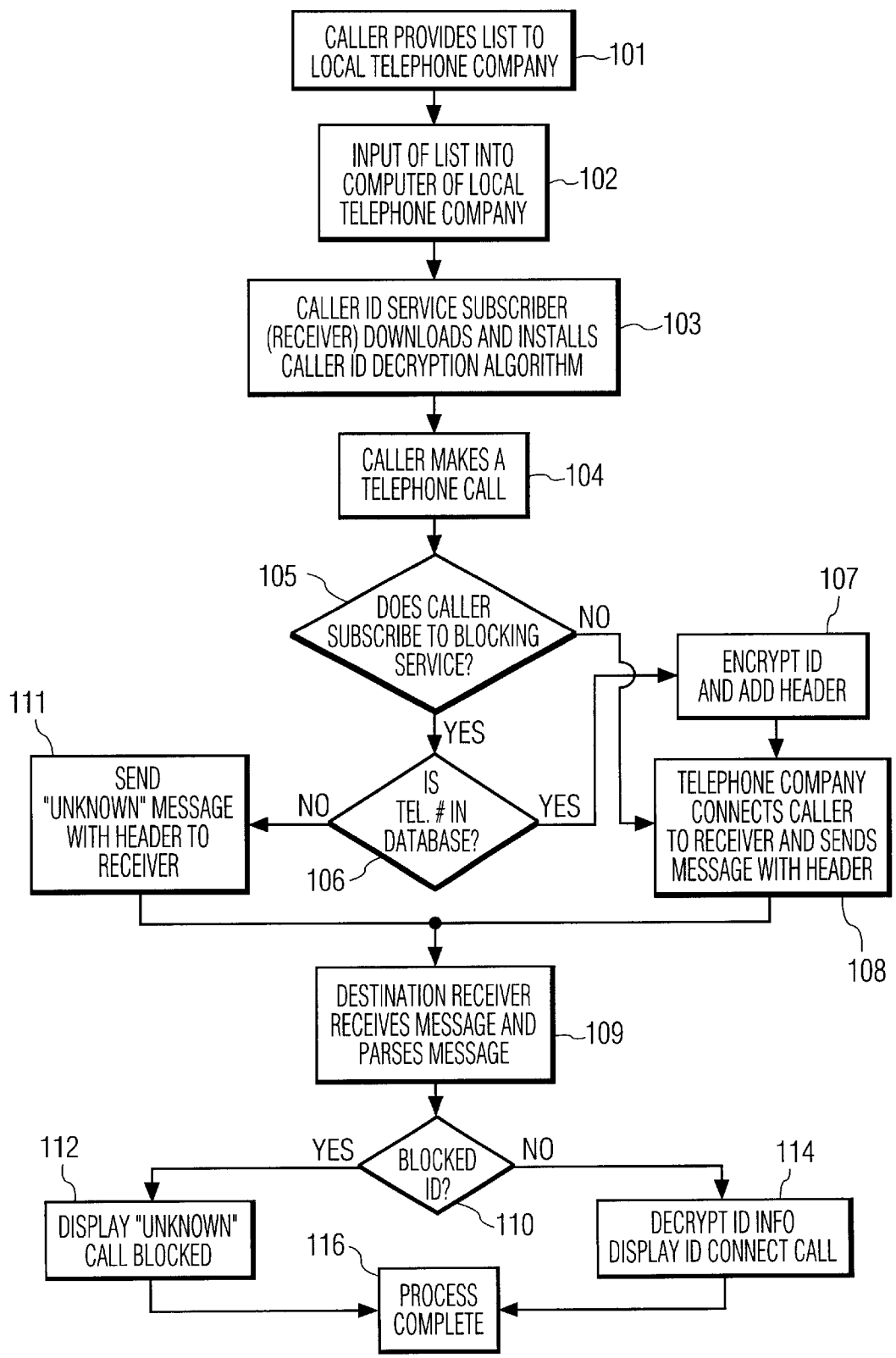
FIG. 2 is a flow chart of the operation of the overall system of the present invention.

Referring specifically to FIG. 1 and the flow chart of FIG. 2, the following shows a typical procedure.

A caller 10 determines that he would like to partially block his telephone number from the public. The caller provides a list of telephone numbers to the local telephone company indicating which telephone numbers he will make his caller ID information available (Step 101). The list of telephone numbers can be provided in writing, orally or electronically and is preferably stored in a telephone company database.

After the telephone company receives this list, the data is input into its mainframe computer 12. Preferably, this list is small in order to save on system cost. It is foreseen that the telephone company can charge the customer according to how many telephone numbers are contained in the list. Customers who subscribe to the caller ID service download and install the caller ID decryption algorithm on their local caller ID processors or boxes 14, or alternatively, the decryption algorithm can be built into the caller ID boxes 14 (Step 103).

In step 104, the caller places a telephone call. The telephone company receives the caller's calling signal, and determines whether the caller subscribes to the call blocking service (Step 105). If the answer is yes in Step 105, the telephone company searches through the database of its computer 12 to determine if the caller is calling a party having a telephone number on the list of numbers stored therein (Step 106). If the caller is calling a number which is on the list, then the telephone company's computer 12 will encrypt the caller's ID with the destination number, and add a header to indicate the type of message (Step 107). The encrypted message (caller ID) is then sent with the header to processor or caller ID box 14 (Step 108).

Then, the processor or caller ID box 14 receives and parses the message (Step 109). A determination is made as to whether the calling party's ID is blocked (Step 110). If the calling party's ID is blocked (YES in step 110), display 18 displays the message "UNKNOWN" and the ring signal is blocked (Step 112). If the calling party's ID is not blocked (NO in Step 110), the caller ID box 14 decrypts the caller ID information, displays the information on display 18, and the call is connected (Step 114). After display of either "UNKNOWN" in step 112 or the caller ID in step 114, the process is complete (Step 116).

If it is determined in step 105 that the caller does not subscribe to the call blocking service, there is no need for encryption. In such case, the telephone company's computer 12 will add a header to the caller ID, to indicate the type of message, that is, an unblocked message, and send the message (caller ID) with the header to the receiver, in step 108.

In step 109, the processor or caller ID box 14 receives and parses the message. In this case, the header indicates that it is an unblocked message (Step 110), and caller ID box 14 displays the caller's ID on screen 18. The method then continues with steps 114 and 116 as explained above.

If the caller is calling a number that is not within the list that is stored in the database of computer 12, computer 12 will generate and send a complete blocking header to caller ID box 14 in step 111. Thus, if the message indicates that the caller ID is blocked, caller ID box 14 will decrypt the message (header), display a message "UNKNOWN" on screen 18, and the telephone ring is blocked in step 112. This prevents midway interference of different calls.

The message header used by the telephone company can simply be a 2-bit header to indicate the type of incoming telephone call. For example, two bits b1 and b0 can be used for three cases. Thus, for an unblocked caller ID, b0=0 and b1=0. For a completely blocked caller ID, b0=1 and b1=0. Lastly, for an encrypted caller ID, b0=0 and b1 1.

In the case where the encryption/decryption process is not utilized, only one bit is necessary to represent a blocked or unblocked message.

In order to better understand the present invention, specific cases will now be given.

Case 1

In this case, the caller 10 has a completely unblocked ID. When caller 10 dials the telephone number of receiver 16, computer 12 locates the telephone or ID number of the caller, which is encrypted, and sends the caller's ID with the ring signal to the called party. The caller's encrypted ID or telephone number is then received by caller ID box 14 which decrypts the information, displays the caller's ID on screen 18, and then sends the ring signal to the telephone of receiver 16, which begins to ring.

Case 2

In this case, the caller's ID is completely blocked. Thus, when caller 10 dials the telephone number of the called party, computer 12 locates the telephone or ID number of the caller and checks if the caller's ID is to be blocked to the called party. After making this determination, computer 12 blocks the caller's ID and sends a plain ring to the called party. The called party receives the ring signal, and a message "UNKNOWN" is displayed with a time stamp on display 18. Computer 12 then blocks the ring to receiver 16, so that communication between the calling party and the called party cannot be made directly.

Case 3

This case corresponds with the present invention wherein the caller's ID is partially blocked. In this case, as per step 101, the caller provides the telephone company with a limited number of telephone numbers to which the caller is willing to release his ID, and the telephone company'stores this list in computer 12, as per step 102. When the caller dials the telephone number of the called party, as per step 104, computer 12 locates the telephone or ID number of the caller and searches for the caller's list in the database, as per step 106. If the telephone number of the called party is not in the database, the process is the same as in case 2. If the telephone number of receiver 16 is in the database, the process is the same as in case 1, wherein the message is encrypted in step 107.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A method of selective telephone caller identification, comprising the steps of:

providing a list of telephone numbers of second parties to which a first party is willing to release identification information regarding the first party, to a telephone company by the first party, if the first party subscribes to a call blocking service with the telephone company;

storing the list of telephone numbers in a database if the first party subscribes to the call blocking service;

determining whether the first party subscribes to the call blocking service with the telephone company when the first party dials a telephone number to make a telephone call;

searching the list of telephone numbers in the database by the telephone company when the first party dials a telephone number to make a telephone call, to determine if the dialed telephone number is on the list of telephone numbers, when the first party subscribes to the call blocking service;

blocking the telephone call by the first party to the second party when it is determined that the first party subscribes to the call blocking service and the dialed telephone number is not on the list of stored telephone numbers;

providing connection between the first party and the second party when it is determined that the first party subscribes to the call blocking service and that the dialed telephone number is on the list of stored telephone numbers;

encrypting said identification information regarding the first party;

adding a message header to the encrypted identification information corresponding to whether a signal sent by the telephone company to said second party is an unblocked signal, a blocked signal or an encrypted signal; and sending said encrypted identification information regarding the first party to the second party when it is determined that the first party subscribes to the call blocking service and the dialed telephone number is on the list of stored telephone numbers.

2. A method according to claim 1, further including the step of decrypting said encrypted identification information after it is received by the second party.

3. A method according to claim 1, wherein said message header is a two bit message header.

4. A method according to claim 1, further including the step of sending a blocking message when it is determined that the first party subscribes to the call blocking service and the dialed telephone number is not on the list of telephone numbers.

5. A method according to claim 4, wherein said message header is a two bit message header.

6. A method according to claim 1, further including the steps of:

providing connection between the first party and the second party when it is determined that the first party does not subscribe to the call blocking service; and sending said encrypted identification information regarding the first party to the second party when it is determined that the first party does not subscribe to the call blocking service.

7. A method according to claim 6, further including the steps of:

decrypting said encrypted identification information after it is received by the second party.

8. A method according to claim 1, further including the step of:

adding a message header to the encrypted identification information corresponding to whether a signal sent by the telephone company to said second party is an unblocked signal, a blocked signal or an encrypted signal.

9. A method according to claim 8, wherein said message header is a two bit message header.

10. A method of selective telephone caller identification, comprising the steps of:

providing a list of telephone numbers of second parties to which a first party is willing to release identification information regarding the first party;

storing the list of telephone numbers in a database;

determining whether the first party subscribes to the call blocking service when the first party dials a telephone number to make a telephone call;

searching the list of telephone numbers in the database when the first party dials a telephone number to make a telephone call, to determine if the dialed telephone number is on the list of stored telephone numbers, when the first party subscribes to the call blocking service;

providing connection between the first party and the second party when it is determined that the first party subscribes to the call blocking service and the dialed telephone number is on the list of stored telephone numbers;

encrypting said identification information regarding the first party when it is determined that the first party subscribes to the call blocking service and the dialed telephone number is on the list of stored telephone numbers;

adding a message header to the encrypted identification information corresponding to whether a signal sent by the telephone company to said second party is an unblocked signal, a blocked signal or an encrypted signal; and sending said encrypted identification information regarding the first party to the second party when it is determined that the first party subscribes to the call blocking service and the dialed telephone number is on the list of stored telephone numbers.

11. A method according to claim 10, further including the step of decrypting said encrypted identification information after it is received by the second party.

12. A method according to claim 10, wherein said message header is a two bit message header.

* * * * *